Figure 1:
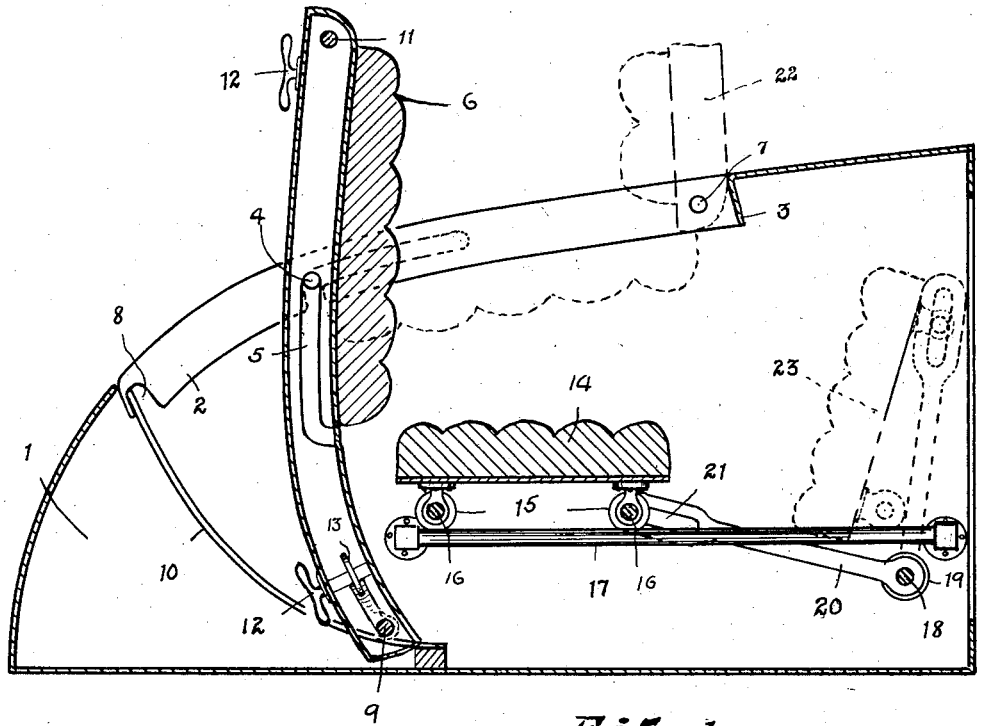

June 9, 1936.   F. E. MONTGOMERY   2,043,804
VEHICLE BODY CONSTRUCTION
Filed March 25, 1935

INVENTOR.
Floyd E. Montgomery.
BY
Geo. Stevens
ATTORNEY.

Patented June 9, 1936

2,043,804

UNITED STATES PATENT OFFICE 2,043,804

VEHICLE BODY CONSTRUCTION

Floyd E. Montgomery, Duluth, Minn., assignor of one-third to Peter A. Homicke and one-third to Walter P. Soneson, both of Duluth, Minn.

Application March 25, 1935, Serial No. 12,804

3 Claims. (Cl. 296—66)

This invention relates to vehicle body construction and has reference particularly to that type of vehicle body having therein what is known in the trade as a rumble seat, and it is the principal object of my present invention to have such rumble seat construction convertible so that it may be moved readily out of the way and the space used for the carrying of luggage, etc.

Other objects and advantages of the invention will appear in the following description thereof.

Figure 2:
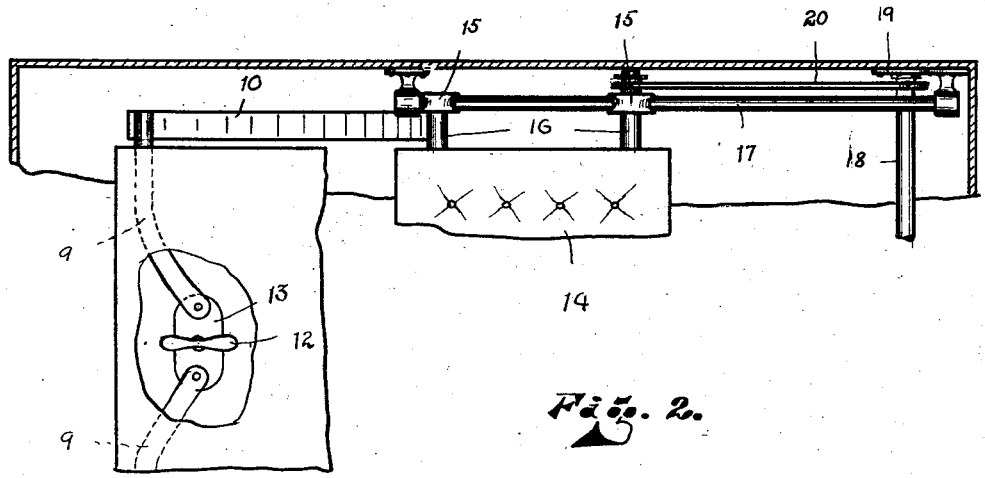

Referring now to the accompanying drawing forming part of this application, and wherein like reference characters indicate like parts:

Figure 1 is a central sectional view of my improved convertible rumble seat construction, Figure 2 is a partial top plan view of the mechanism employed, showing portions of the seat and back.

In the drawing the numeral 1 represents that portion of the body of a vehicle immediately to the rear of the driver's seat, and which is provided with the usual opening therein for the installation of a rumble seat, the back portion of which is pivoted to the body and, when closed, is flush therewith. In my particular construction the sides of the opening in the body are provided with downwardly extending flanges, such as indicated at 2 and 3, and from each side flange there is provided an inwardly extending pintle 4, which extends within a relatively long L-shaped slot 5, there being one of such in each side of the back of the rumble seat. The rumble seat is constructed of metal and provided with a tufted surface as indicated at 6 for the comfort of the passengers.

Also in the side flanges 2 there is provided near the flange 3 a hole 7, and at the other end with a slot 8. This latter slot is for the reception of the end of the lever 9 which extends through the sides of the rumble seat back and into said slot when the seat is closed. It will be understood that there is one of these levers 9 extending from each side of the back, each into its respective slot, and to guide the levers into the slots when the seat is lowered from opened to close position there is provided a pair of guides or runways one of which is illustrated at 10 and is slightly arcuate in form, one end being fixed to the bottom of the body and the other end adjacent the slot 8, so that the levers 9 ride up and down on these guides when the seat is being opened or closed, the latter, during such process, pivotting on the pin 4 which reciprocates in the slot 5. At the upper end of the rumble seat back there is another pair of levers, identical with the levers 9, one extending from each side and into the hole 7 when the seat is closed. One of these levers is indicated in section at 11, and they, as well as the levers 9, may be withdrawn by means of the handle 12 which when manipulated turns a crank plate 13 to which the levers are pivotted. If the device were only used as a rumble seat there would be no necessity for withdrawing the levers 9. The seat portion is indicated at 14, and is in the nature of a carriage, being supported upon four wheels, two of which are indicated at 15, there being a pair at each end of the axles 16, and these wheels operate on side rails 17, one being fixed to each side of the vehicle body. A shaft 18, supported at its ends in brackets 19, fixed to the sides of the vehicle body, extends transverse the body, and has fixed adjacent each end a link 20, and the opposite end of each lever is enlarged and provided with an elongated slot 21 in which is pivotally secured the axle 16.

Now when it is desired to use the device as a rumble seat, the lever 12 would be manipulated to withdraw the pins 11 from the holes 7 when the back would be free to pivot on the pins 4 and also slide in the slots 5, the ends of the levers 9 of course sliding on their respective guides 10, to substantially the position shown in Figure 1 of the drawing. When, however the space is to be used for the carrying of luggage, etc., it is the levers 9 that are withdrawn, leaving the levers 11 in the holes 7 and on which the seat back pivots upwardly as indicated in dotted lines at 22. Then the seat carriage 14 may be moved forwardly and tipped up as indicated in dotted lines at 23, when the entire space may be used for luggage. Should it become desirable to entirely remove the back of the rumble seat from the vehicle, both the levers 9 and 11 would be withdrawn when said back could be lifted from the vehicle, the pins 4 slipping out of the L-shaped slots 5.

Having thus described my invention, what I claim and desire to secure by Letters Patent, is:

1. The combination with a vehicle body having a flanged opening therein for accommodation of a rumble seat, a combined rumble seat back and closure for said opening, said seat back and closure being pivotally and slidably mounted intermediate of its ends upon opposite side flanges of said opening, and withdrawable pintles at the uppermost opposite corners of said back and closure for cooperation with registrable holes in the side flanges of the opening for pivotal support of said seat back and closure when desired.

2. The combination with a vehicle body having a flanged opening therein for accommodation of a rumble seat, pintles projecting inwardly from opposite flanges of said opening, a combined back for said seat and closure for said opening having an elongated slot formed in opposite sides thereof for cooperation with said pintles to pivotally and slidably support said seat back and closure in the side flanges of said opening, and withdrawable pintles at the uppermost opposite corners of said seat back and closure for cooperation with registrable holes in the flanges of said opening for pivotal support of said seat back and closure when desired.

3. The combination with a vehicle body having an opening therein for accommodation of a rumble seat, pintles projecting inwardly from the side walls of said opening, of a combined back for said seat and closure for said opening having elongated L-shaped slots formed in opposite sides thereof for cooperation with said pintles in pivotally and slidably supporting said seat back and closure intermediate of its ends in the side walls of said opening, said back and closure being further characterized by having withdrawable pintles at the uppermost opposite corners thereof for cooperation with registrable holes in the sides of the opening for pivotal support of said seat back and closure when desired.

FLOYD E. MONTGOMERY.